INVENTOR
Gustav Klipping

BY George H Spencer
ATTORNEY

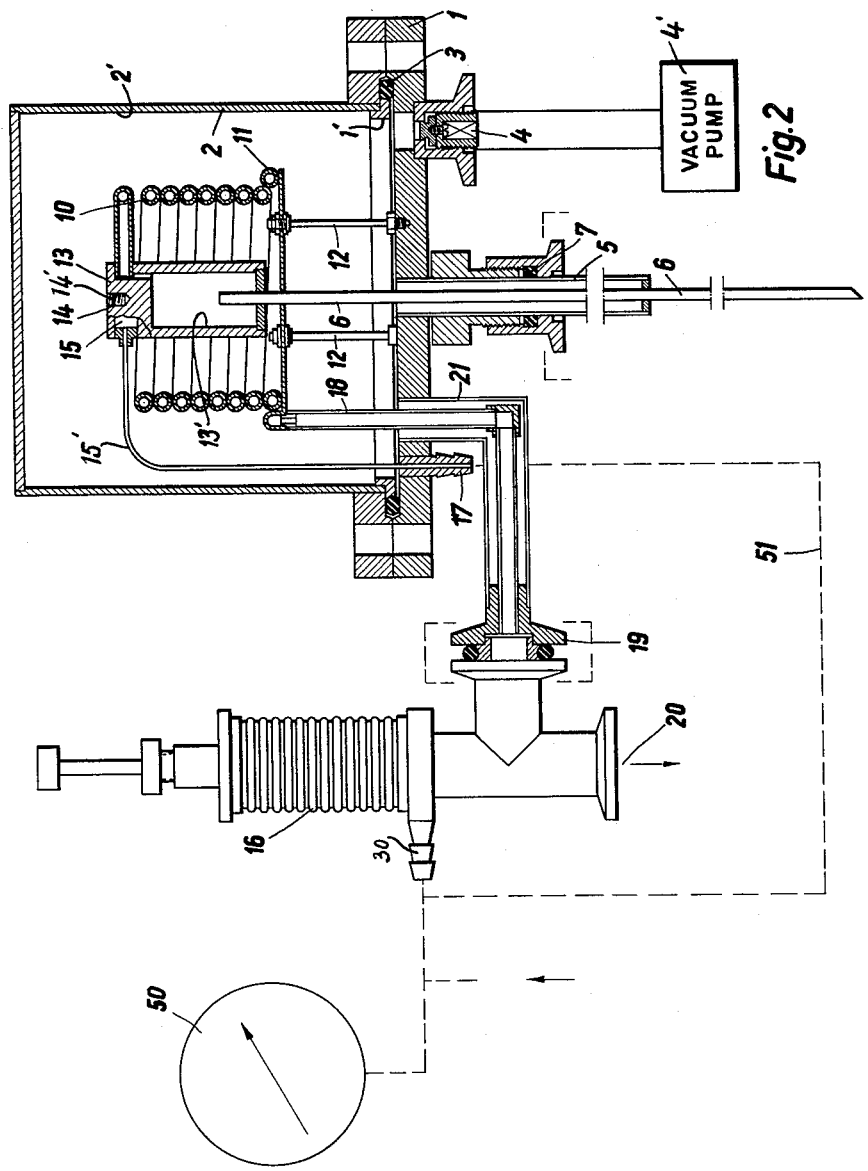

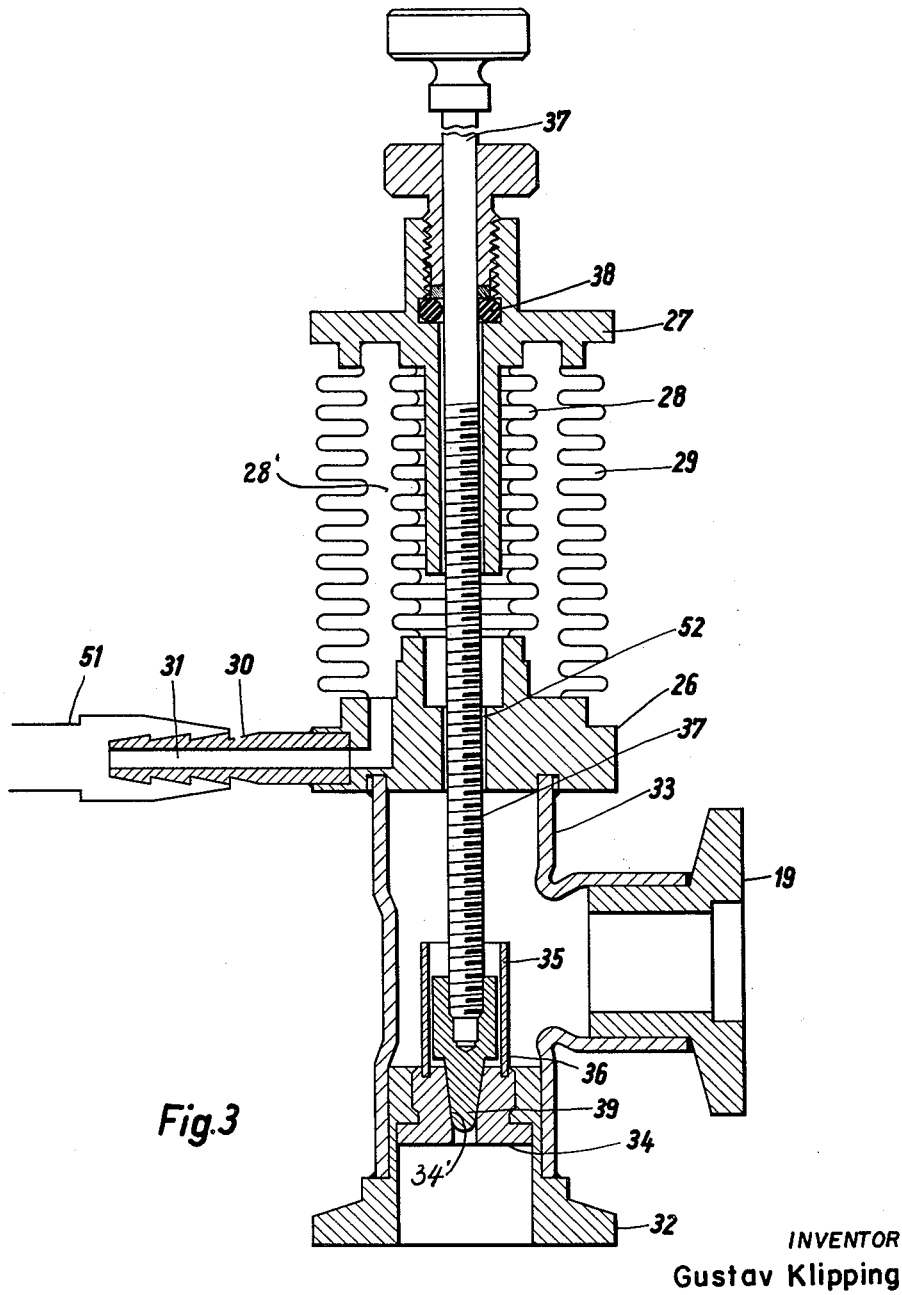

United States Patent Office 3,166,915
Patented Jan. 26, 1965

3,166,915
COOLING ARRANGEMENT
Gustav Klipping, Berlin-Grunewald, Germany, assignor to Max-Planck-Gesellschaft zur Forderung der Wissenschaften e.V., Gottingen, Germany
Filed Feb. 9, 1962, Ser. No. 173,088
Claims priority, application Germany Mar. 1, 1961
7 Claims. (Cl. 62—217)

The present invention relates generally to the cooling art, and, more particularly, to a continuous evaporating device especially useful in the evaporation of liquids having a low boiling point and which are supplied to the evaporator from a liquid supply or a reservoir.

Liquids such as helium and hydrogen, which have low boiling points and which are produced in known types of liquefying plants, are stored in special storage tanks. In order to test the temperature of liquid helium and liquid hydrogen, the cooled liquids must be transferred from these storage tanks into cryostats of suitable design by means of vacuum jacket siphons. Certain types of cryostats which are based upon a common principle of design have become generally accepted. Unless superinsulations are used, such as is taught by A. H. Cockett, W. Molnar, Cryogenics 1 (1960) 21, among others, an arrangement is provided which includes a vacuum insulated inner vessel having liquid helium or liquid hydrogen which is surrounded by a similar vacuum insulated jacket for radiation protection which is cooled by liquid nitrogen. Feed pipes having thin walls are used and are constructed of a material having very low heat conductivity.

The use of these known cryostats presents many difficulties and drawbacks. Due to the vacuum nature of the vessels, providing them with a sufficient heat insulation creates requirements which are difficult to attain as concerns the constructional design and the actual manufacture of these cryostats. Also, leaks occur relatively easily in the connections of the cryostats and the vacuum jacket siphons. The cryostats are pre-cooled by using liquid nitrogen, and in order to cool the cryostats to liquid helium or hydrogen temperature, a fairly large amount of refrigerant must be used, and this amount of refrigerant is further increased due to the unfavorable technique of siphoning.

If a measuring process is interrupted or terminated, then large losses of refrigerants will occur because during the measurement the cryostat must always be filled to a predetermined minimum level. The use or consumption is also unfavorably affected by the harmfully large volume of such cryostats. Another drawback is that usually there is great difficulty in gaining access to the sample or specimen to be measured. Tests of long duration may only be carried out with repeated resiphoning of cooling liquids for limited periods of time. In practice, the adjustment of constant intermediate temperatures is hardly ever successful.

With these defects of the prior art in mind, a main object of the invention is to provide an evaporating device for cooling which eliminates the defects of the prior art mentioned above.

Another object of this invention is to provide an evaporating arrangement, wherein the amount of evaporation, and thus of cooling, is automatically controlled in functional dependence upon the temperature at a predetermined detection point in the arrangement.

A further object of this invention is to provide a device of the character described wherein constant temperatures may be maintained within definite temperature ranges.

These objects and others ancillary thereto are accomplished according to preferred embodiments of the invention wherein a continuous evaporating device is provided in the form of a hollow evaporator body having a feed pipe communicating therewith and submerged in a liquid supply. The interior of the evaporator body is connected with a pump via an exhaust conduit having a throttle element which controls the suction of the pump in functional dependence upon the temperature at a selected temperature detection point in the vicinity of the evaporator body. This type of evaporating device may sit directly upon the liquid supply tank and permits maintenance of constant temperatures within definite ranges, if desired at 4.3° K., with economic use of the low boiling liquids which serve as refrigerants.

When the pump is running and the throttle is open, a vacuum pressure is created in the interior chamber of the hollow body of the evaporator. This causes the low boiling liquid, for example, helium, to rise in the feed pipe and to flow into the inner chamber of the hollow body of this evaporator. The liquid evaporates and thus provides the desired cooling. The gas, which is formed when the liquid evaporates, is drawn off by the vacuum pump and conveyed into a gas collection tank, if so desired.

When the hollow body of the evaporator or the specimen to be kept under surveillance and which is mounted on the body, has cooled to the desired temperature, the throttle element reduces or prevents the flow of refrigerant through the hollow body of the evaporator to such an extent that the temperature will remain as constant as possible with a minimum usage of refrigerant. A bellows-controlled needle valve is suitable for this purpose, preferably one in which the bellows are controlled by vapor pressure. Under the most favorable conditions of design and control, the liquid evaporates only in the evaporator body and it may be expedient to design the exhaust conduit as a spiral which extends around the hollow body of the evaporator so that at least partial protection against radiation is also provided.

Additional objects and advantages of the present invention will become apparent upon consideration of the following description when taken in conjunction with the accompanying drawings in which:

FIGURE 2 is a vertical sectional view taken through the evaporator.

FIGURE 3 is a schematic vertical sectional view of the control valve.

Figure 1:
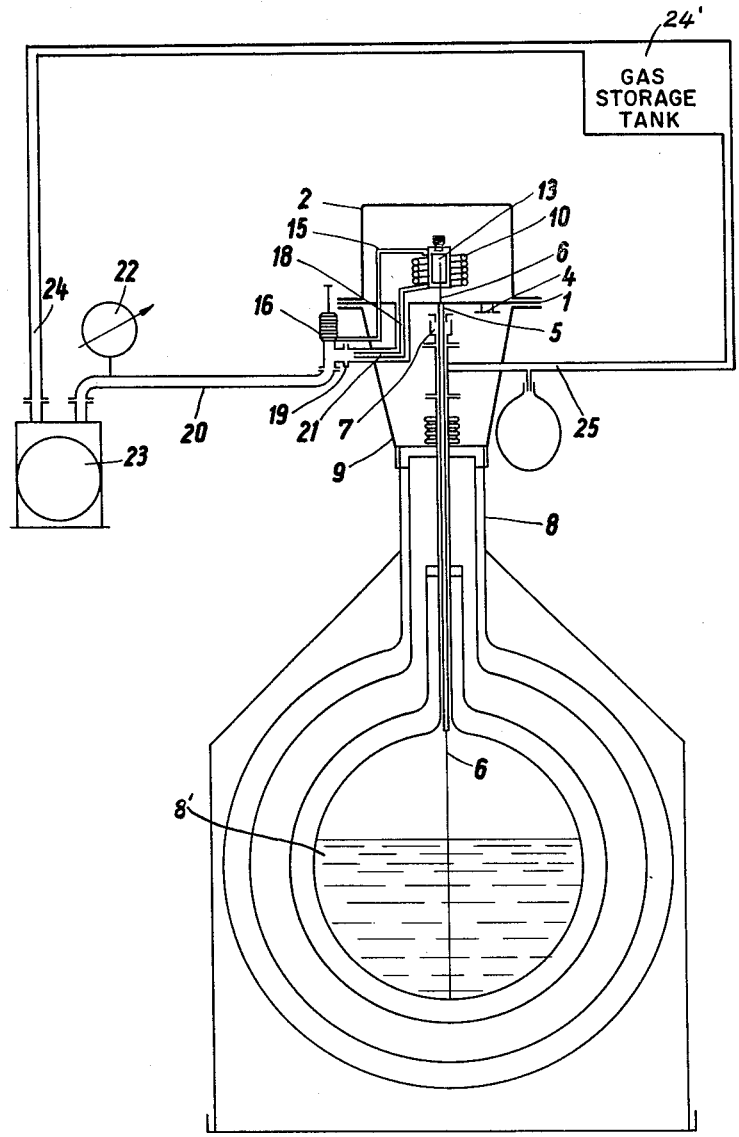
FIGURE 1 is a schematic view, partially in section, of an evaporator which is connected with a liquid supply and a vacuum pump.

In the device comprising the present invention, the control of the throttling element is performed in an advantageous manner by means of a vapor pressure thermometer which contains a gas having a condensation temperature corresponding to the desired temperature value in the vicinity of the evaporator or to the desired temperature value at the place in the evaporator at which measurement is to take place (detection point). The pressure variation which occurs may be used directly to displace a valve element in the throttling device. In this connection, it may be advantageous for the throttling device, which has an interior valve element or valve body, to have at least one bellows which defines a closed chamber which is connected with a sensing element at the detection point by means of measuring conduits, and which contains an appropriate gas therewithin.

In a preferred embodiment of the invention this throttling device comprises two bellows, one within the other, which form a chamber which is a torus in cross section, the bellows being soldered to a common base plate. The torus chamber communicates with a flexible tube and a nickel silver capillary and forms a portion of a vapor pressure thermometer, with another portion thereof being located at the evaporator body or at the specimen to be measured. A pressure gauge or manometer which is interposed supplies the temperature reading and indicates the fluctuation in temperature. A valve stem, which is sealed with respect to the suction line, is preferably supported in a cover plate and this valve stem can be moved so that, at each pressure adjusted in the vapor pressure thermometer, it is directly in front of or covers and closes a valve seat arranged in the suction line.

If the temperature at the evaporator drops to such a point that the gas which fills the vapor pressure thermometer condenses due to the flow of the refrigerant or cooling medium, then the bellows will contract. This causes the end of the valve stem to be moved against the valve seat or toward the valve seat and thereby reduces or prevents flow of the cooling medium. Because of this closing and reduction of movement or cessation of movement of the cooling medium, the evaporator again becomes warmer, and the pressure in the vapor pressure thermometer rises. The bellows thus expand and the valve is again opened. This is the controlling process which maintains constant temperature. If this stem is moved outwardly, the temperature at the evaporator will be lowered. Thus, with the pump operating, the temperature of the evaporator may be varied by mere displacement of the stem.

The control device requires a finite difference between the temperature of the liquid in the supply tank and the temperature which is to be adjusted at the evaporator body, for example $\Delta T > 0.1°K$. For control above $4.2°K$. an excess pressure of gas, such as helium, must be produced in the vapor pressure thermometer. With this predetermined excess pressure, the upper control temperature in the helium range is fixed (1 atmosphere above atmospheric pressure=$5°K$.). In the temperature range of $13°$ to $20°K$., hydrogen at a pressure of 760 mm. of Hg is used to fill the bellows. By using other appropriate gases for filling the bellows, even higher intermediate temperatures may be controlled.

Since the need for a nitrogen cooled jacket for radiation protection has been eliminated by the present invention, only a fraction of the amount of refrigerant required for the previously known cryostats is needed to cool the evaporator of the present invention to the lowest temperatures. In static operation a minimum consumption of cooling medium is assured. Also, the siphoning process, which, as mentioned above, involves a larger loss of the cooling medium, is eliminated. Furthermore, when an experiment is terminated or interrupted, there is no loss of refrigerant.

The adjustment of intermediate temperatures is rendered possible by merely turning the threadedly mounted valve stem. The adjusted temperature remains constant without requiring any special attention. The small consumption of the cooling medium or refrigerant, and the operational reliability of operation of the evaporator, render it possible to use long duration tests of a few hundred hours. Furthermore, compared to the known cryostats, the evaporator, according to the present invention, has many advantages. The design is simple and inexpensive to construct and results in favorable operation which is reliable over long periods of time. Moreover, the evaporator is so arranged as to be more easily accessible than those which have been known previously.

With more particular reference to the drawings, FIGURES 1 and 2 illustrate an embodiment of an evaporator or evaporator body 13 having an interior chamber 13'. This evaporator is disposed within a vacuum chamber 2' which is defined by a base or flange 1 and a cup-like housing 2 disposed on the flange and encircling and surrounding the evaporator 13. The flange 1 and housing 2 are sealed by means of an O-ring 3 in order to define the sealed vacuum chamber 2'. An evacuation line 4 communicates with vacuum chamber 2' by means of a port 1' formed through the flange 1, and a vacuum pump 4' is connected with the evacuation line 4 so that an arrangement is provided whereby a vacuum may be formed in the gas-tight vacuum chamber 2'.

A reservoir or supply tank 8 of a refrigerant or cooling medium 8' is provided and has a supporting assembly 9 which may directly support the above-mentioned apparatus. A feed pipe 6 is connected with the supply tank 8 and extends into the supply of refrigerant 8' and is connected at its upper end with the interior chamber 13' of the evaporator 13, by extending through an opening in the base of the evaporator. A covering sleeve 5, which is open at the top, is soldered into an opening in the flange 1, and has an opening through its lower wall through which the feed pipe 6 may extend. In this manner, a vacuum jacket is formed to better insulate the feed pipe 6. Thus, the vacuum jacket of the feed pipe 6 is evacuated together with the inner chamber 2' of the housing 2. The feed pipe 6 is connected into a siphon outlet of the supply tank 8 by means of a gas-tight O-ring screwcap 7.

The evaporator is supported on a copper base 11 with a copper spiral coil of pipe 10. The copper base itself is supported from the flange 1 by means of thin alloy steel pins 12. The pins 12 provide sufficient stability and proper insulation with respect to heat conduction, from flange 1 to evaporator body 13. The copper spiral coil of pipe 10 is tightly wound and this coil and the base plate 11 provide evaporator 13 with protection from heat radiation. The evaporator is fastened to and has gas communication with the open ends of the copper spiral coil of pipe 10 and the feed pipe 6. Thus, heat losses due to convection are practically eliminated because the evaporator is surrounded by a vacuum; radiation losses are prevented because of the radiation protection provided by the coil of pipe 10 and the copper base plate 11; and conduction losses are reduced to a minimum due to the particular construction of the pins 12, mentioned above, and because the evaporator body has contact with only the end of pipe coil 10 and the end of feed pipe 6 and with a sensing element of the thermometer, which will be described in more detail below.

A bore 14', in the upper end of the evaporator 13, is provided with an internal thread 14 and serves for the attachment of specimens which are to be kept under surveillance. A sensing element 15 of a vapor pressure thermometer is also connected with the evaporator body 13. This thermometer provides an indication of the temperature by means of a manometer 50 and also controls a throttle valve 16 which, in turn, controls the supply of refrigerant to the evaporator in a manner which will be further explained below. A line 15' is connected from the sensing element 15 to a flexible tube nipple 17 which projects outwardly from the flange 1 and to which a connection line 51 may be secured whereby the sensing element 15 may be connected with the pressure gauge 50 and the control valve 16.

The copper spiral coil of pipe 10 is connected to a vacuum-insulated connecting line 18. An O-ring sealed small flange connection 19 is used to connect the vacuum-insulated line 18 with the control valve 16. A protective insulating sleeve 21, which is open at the top and soldered to flange 1 similarly as the protective tube 5, surrounds the line 18 and is evacuated simultaneously with the chamber 2'.

A vacuum pump 23 is connected to a gas storage tank 24' by means of a discharge or exhaust line 24. This pump is also connected to the control valve 16 by an evacuation line 20, whereby upon operation of pump 23, a vacuum is formed in the coil of pipe 10. A pressure gauge 22 is connected to the suction line 20. The refrigerant reservoir 8 is provided with an inlet conduit 25, which is also connected with the gas storage tank 24' and thus a self-contained system may be formed. This guarantees complete recovery of the refrigerant.

With more particular reference to FIGURE 3, the throttle or control valve 16 comprises two bellows, an outer bellows 29 and an inner bellows 28, which together define a chamber 28', which is annular in cross section. These bellows are soldered to a common disk-like end element or bottom plate 26 and to a common disk-like end element or top or cover plate 27. The chamber 28' communicates with the sensing element 15 by means of the connecting line 51. This communication is provided by an opening 31 formed through the bottom plate 26 and which communicates with chamber 28' and extends through a flexible tube nipple 30 to which the connecting line 51 may be secured.

A T-fitting 33 is soldered to the bottom of plate 26 and is connected to connecting line 18 and evacuation line 20 by means of flanges 19 and 32. A valve seat element 34 is detachably connected into the leg adjacent flange 32, such as by thread means or the like, and defines a conical valve seat 34'. A tubular stem guide 35 is carried in the upper surface of valve seat member 34 and is provided, at its lower end, with a plurality of circular bores 36.

A valve stem or spindle 37 is inserted into the top plate 27 in a gas tight manner by means of an O-ring sealing cap 38 which is threaded thereto. The valve stem passes through or penetrates a bore 52 formed through the bottom plate 26. When the bellows 28 and 29 contract and expand, the valve stem 37 is moved downwardly and upwardly, respectively. The valve stem 37 is threaded over the majority of its length to allow vertical adjustment in the cover plate 27. Thus for any position of the bellows 28 and 29, a conical valve element 39 may always be brought directly against the valve seat 34' to seal the opening defined by the seat. Valve element 39 is threaded on the end of stem 37 and along with the valve seat member 34 define a matching pair of elements which may be replaced in pairs.

The mode of operation of this device will now be set forth in order to illustrate the utility of the present invention. With the vacuum pump 23 operating, a vacuum pressure is formed in chamber 13' of evaporator 13. This causes liquid to be drawn through the feed pipe 6 and into the chamber 13 of the evaporator. The liquid evaporates in this chamber and thus provides the desired cooling of the evaporator 13. The gas which is formed is drawn off from the chamber 13' by means of the vacuum pump 23, through the spiral coil of pipe 10 and through conduit 18 to the throttle or control valve 16. Here it is conveyed through the valve and through conduit 20 to the vacuum pump 23. The gas is then pumped from the high pressure side of the pump into the discharge conduit 24 and into the gas storage tank 24'.

Cooling the evaporator 13 condenses the gas which fills the vapor pressure thermometer defined by the chamber 28' between bellows 28 and 29 due to the cooperation of the connecting line 51 and the sensing element 15. The resulting drop in pressure causes contraction of the bellows and this forces the valve element 39 downwardly toward and against the valve seat 34'. Because of this, the flow of exhaust gas which is drawn away from evaporator 13 by the vacuum pump 23 is reduced or interrupted. The liquid in the sensing element 15 finally evaporates due to the rising temperature of the evaporator 13 and provides a pressure increase in the chamber 28' defined by the bellows. This rise in temperature is due to the fact that less of the refrigerant from the reservoir is drawn into the evaporator. The rise of temperature causes the bellows chamber 28', and thus the bellows 28 and 29, to expand and thus raises the valve element 39 from the valve seat 34' whereby the passage through the valve seat 34' is opened or increased in size. Thus, the amount of exhaust gas which may pass therethrough increases and the amount of liquid flowing from the reservoir 8 through feed pipe 6 and into the evaporator increases.

Since the processes, as described above, proceed automatically during operation, an extremely constant temperature range may be maintained at the evaporator body 13. In an actual test which has been performed, with one embodiment which has been constructed, hydrogen at standard pressure or 760 mm. of Hg, or helium at an excess pressure of 1 atmosphere above atmospheric pressure, was used as the gas which fills the vapor pressure thermometer with the chamber 28'. This actually constructed device maintained a constant temperature value of about $4.5° K. \pm 0.01° K$. Observation of the throttle or control valve 16 indicated that several controlling operations occurred each minute.

It will be understood that the above description of the present invention is susceptible to various modifications, changes, and adaptations, and the same are intended to be comprehended within the meaning and range of equivalents of the appended claims.

What is claimed is:

1. A continuous evaporating device for the evaporation of liquids having boiling points below 30° K. comprising an evaporator chamber, a liquid reservoir, a feed pipe extending into said liquid reservoir and in communication with the interior of said evaporator, a vacuum pump, an evacuation line in communication with the low pressure side of said vacuum pump and the interior of said evaporator chamber, a throttle valve means interposed in said evacuation line, and a pressure responsive control means for said throttle valve means including a vapor pressure thermometer filled partly with a liquid having a boiling point below 30° K. and partly with vapor in equilibrium with the condensed phase and connected to sense the temperature at a selected detection point in the vicinity of said evaporator chamber so as to control the flow through said evacuation line in functional dependence upon the detected temperature.

2. A continuous evaporating device for the evaporation of liquids having boiling points below 30° K. comprising, in combination:
   (a) coolant liquid supply means;
   (b) a vacuum housing defining a vacuum chamber, said vacuum housing including a stationary portion and a demountable portion adapted to be vacuum sealed against said stationary portion;
   (c) means for creating a vacuum in said vacuum chamber;
   (d) an evaporator housing completely enclosed by said vacuum chamber and having an evaporator chamber for changing a coolant liquid into a gas to thereby remove heat from and cool said evaporator;
   (e) feed means for submersion in liquid in said coolant liquid supply means and passing through said evaporator and vacuum housings to provide for liquid communication with said evaporator chamber;
   (f) a vacuum pump having a suction inlet and a pressure outlet;
   (g) an evacuation line in communication with the suction inlet of said vacuum pump and passing through said evaporator and vacuum housings into said evaporator chamber for creating a vacuum therein;
   (h) throttle valve control means for controlling the flow of a coolant liquid through said feed means into said evaporator chamber to thus control the cooling in said evaporator chamber, and a vapor pressure thermometer positioned to sense the temperature at a selected detection point in the vicinity of said evaporator housing and connected to said throttle valve control means so as to provide regulation thereof and wherein said vapor pressure thermometer is filled partly with a liquid having a boiling point below 30° K. and partly with vapor in equilibrium with the condensed phase.

3. A device as defined in claim 2, wherein said evacuation line partially surrounds said evaperator housing within said vacuum housing to provide heat radiation shielding for said evaporator housing.

4. A device as defined in claim 3, wherein said throttle valve control means includes a member defining a valve seat and a cooperable movable valve element which is arranged so that the displacement thereof is dependent upon the gas pressure in said vapor thermometer.

5. A device as defined in claim 4, wherein said valve control means includes at least one bellows defining a closed chamber, and conduit means passing through said evaporator and vacuum housings and placing said closed chamber in communication with said vapor pressure thermometer.

6. A device as defined in claim 4, wherein said throttle valve control means includes a first closed bellows defining a chamber, a second closed bellows within said first closed bellows and defining a chamber therebetween, and connection means communicating said vapor pressure thermometer with said bellows chamber between said first and second bellows, an adjustable control element connected to a first end element movably connected for movement with both bellows, said adjustable control element penetrating and passing through a second end element common to both bellows and having said valve element on its free end disposed on the other side of the second end element, which valve element is disposed within said evacuation line for controlling the flow therethrough.

7. A device as defined in claim 6, wherein said adjustable control element is a threaded spindle and said first end element has a threaded aperture which engages the threads of said spindle.

References Cited in the file of this patent

UNITED STATES PATENTS

| | | |
|---|---|---|
| 1,464,319 | Heylandt | Aug. 7, 1923 |
| 1,976,688 | Dana et al. | Oct. 9, 1934 |
| 2,000,965 | Lipman | May 14, 1935 |
| 2,053,290 | Kaufman | Sept. 8, 1936 |
| 2,082,009 | Kirgan | June 1, 1937 |
| 2,756,765 | Agule et al. | July 31, 1956 |
| 2,759,674 | Jorgensen | Aug. 21, 1956 |
| 2,851,864 | Webber | Sept. 16, 1958 |
| 3,016,716 | Walker | Jan. 16, 1962 |
| 3,025,680 | De Brosse et al. | Mar. 20, 1962 |
| 3,092,977 | Skinner | June 11, 1963 |
| 3,097,500 | More | July 16, 1963 |

OTHER REFERENCES

"Cryogenics," December 1960. (Article by Rollin et al. on pages 75 and 76 relied on.)

"Advances in Cryogenic Engineering," volume 4 (Timmerhaus), published by Plenum Press, Incorporated (New York), 1960. (Article by Culbertson on pages 426–435 relied on.)

"Advances in Cryogenic Engineering," volume 5 (Timmerhaus), published by Plenum Press, Incorporated. (New York), 1960. (Article by Nicol et al. on pages 332–339 relied on.)

"Instruments and Experimental Techniques" (USSR), No. 4, July-August 1960. (Article by Fradkov on pp. 126–130 relied on.)

"Advances in Cryogenic Engineering," vol. 3, published by Plenum Press, Inc. (New York), 1960. (Article by Tracey et al. on pp. 226–231 relied on.)

"Instruments and Experimental Techniques" (USSR), No. 4, July-August 1961. (Article by Fradkov on pp. 170–173 relied on.)